Sept. 13, 1932.  C. J. ROHLAND  1,876,757
CRYSTAL CUTTING APPARATUS
Filed Dec. 24, 1928  2 Sheets-Sheet 1
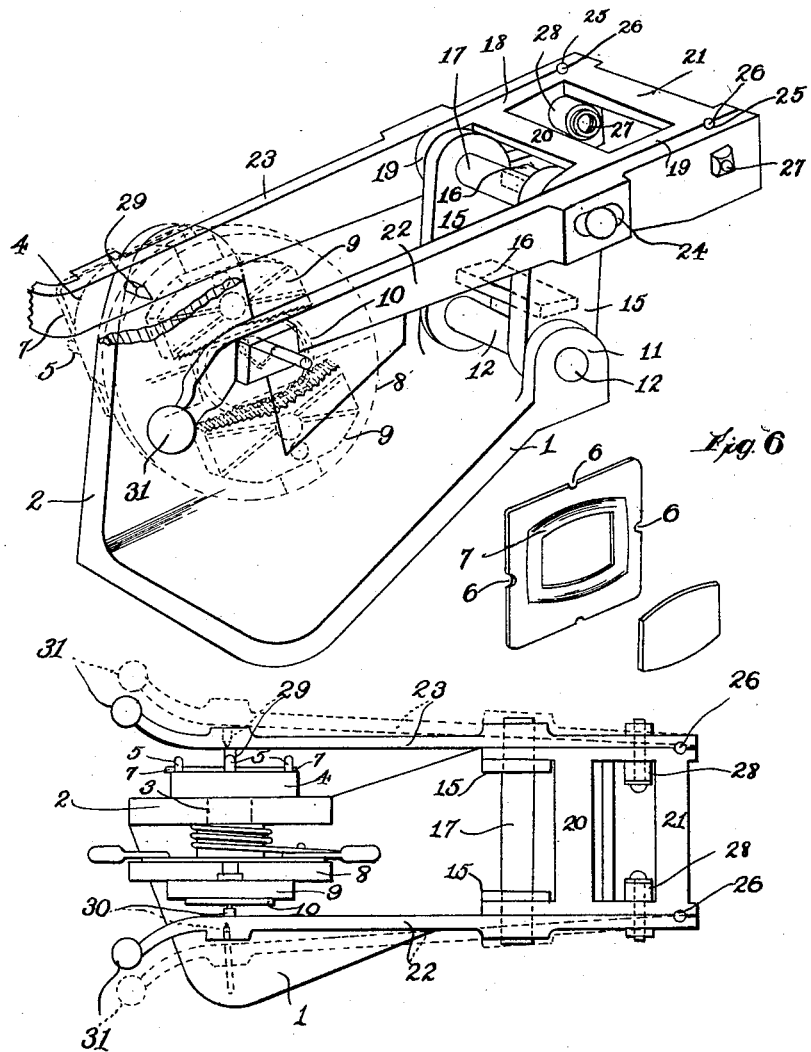
INVENTOR.
Curt J. Rohland
BY
Cornelius Zabriskie
ATTORNEY.

Sept. 13, 1932.          C. J. ROHLAND                 1,876,757
                    CRYSTAL CUTTING APPARATUS
                Filed Dec. 24, 1928        2 Sheets-Sheet 2
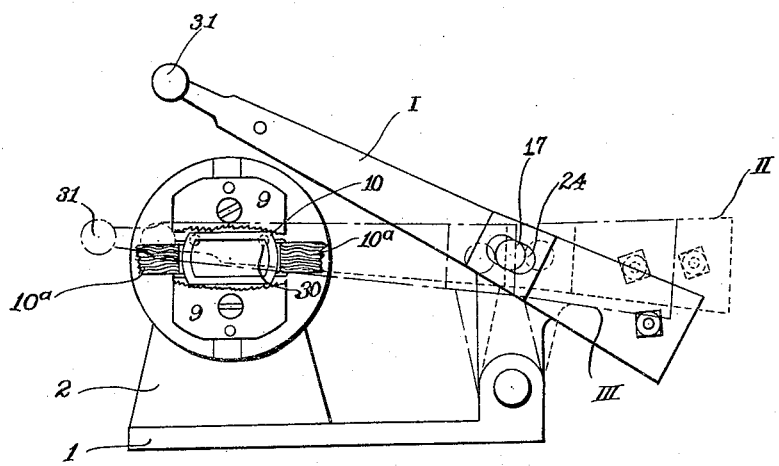
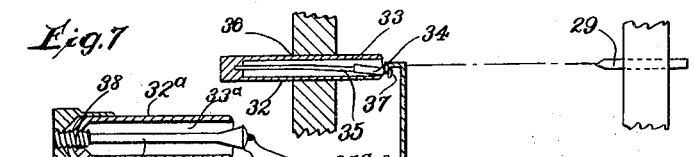
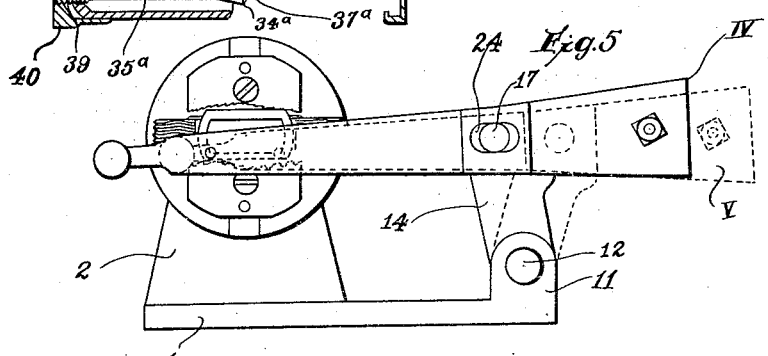
INVENTOR.
Curt J. Rohland
BY
ATTORNEY.

Patented Sept. 13, 1932

1,876,757

UNITED STATES PATENT OFFICE

CURT J. ROHLAND, OF SEEKONK, MASSACHUSETTS, ASSIGNOR, BY MESNE ASSIGNMENTS, TO IRA GUILDEN, OF NEW YORK, N. Y.

CRYSTAL CUTTING APPARATUS

Application filed December 24, 1928. Serial No. 328,132.

This invention relates to apparatus for cutting crystals to accurate size and shape for fitting into bezel seats of fancy shaped watches, and more particularly wrist watches. Machines have heretofore been suggested for doing this work, but in every instance they have been in the form of heavy complicated machinery, expensive to manufacture and not entirely satisfactory in the carrying out of their intended functions.

The purpose of the present invention is to provide a simple and efficient mechanism for accomplishing the result stated and to so constitute such mechanism that greater accuracy may be obtained in a more expeditious and commercially satisfactory manner.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a perspective view of apparatus embodying the present invention, the spindle, blank holder and chuck being illustrated in phantom to more clearly show the operating parts of the structure.

Figure 2 is a plan view of the apparatus shown in Figure 1 with the parts shown in phantom in Fig. 1 illustrated in full lines.

Figures 3 and 4 are side elevations of the apparatus showing the parts in the different operative positions which they assume during the various operations of cutting a crystal.

Figure 5 is a fragmental plan view showing the relative relation between the follower and the cutter and illustrating the follower in central longitudinal section to illustrate the manner in which errors in cutting are obviated through the lost motion to which I have referred.

Figure 6 illustrates a blank from which a crystal also shown in said figure has been cut.

Figure 7 shows modified follower construction.

Referring to the drawings, 1 designates the frame of the apparatus. This frame is provided adjacent one end with an upstanding standard 2 in which a spindle 3 is supported on a horizontal axis. On one end of this spindle is fixed a blank holder 4 provided with laterally extending centering pins 5 adapted to cooperate with notches 6 formed in the margins of the four sides of the blank 7 shown in Figure 6, in order to properly support the blank on and center the same with respect to the spindle.

On the other end of the spindle is fixed a self centering chuck 8. This chuck may be of any well known approved form, so long as it will support a watch upon the spindle in centered relation with respect to the blank 7. As shown, the chuck is illustrated as having watch gripping jaws 9 adapted to grip and hold the watch or bezel 10. By reference to Figs. 3 and 4, which most clearly show the watch in place, it will be noted that said watch is tightly held in position and is supported in the machine in a thoroughly efficient manner without necessitating the removal of the straps 10a with which wrist watches are generally provided.

It is characteristic of the present invention that the spindle 3 need not necessarily rotate within the standard 4. In other words, the blank holder and chuck may be rigidly mounted with respect to said standard, although, in practice, I find it convenient to mount the spindle for rotation with considerable friction within the standard so that the parts will normally maintain the position in which they are placed although they can be rotated if desired by particular operators.

As shown, the standard 2 is positioned near one end of the frame 1. At the opposite end of the frame is formed a pair of ears 11 which collectively support a pivot pin 12 and on this pin is mounted a rocker 14. This rocker embodies a pair of parallel links 15 which are spaced apart by rigid spacers 16, so that the links 15 are rigid with respect to one another and are adapted for bodily pivotal movement as a unit on the pin 12.

Extending through the upper ends of the links 15 is a pin 17 which pin is considerably longer than the distance between the links so that it extends well beyond the opposite sides of the rocker. Mounted for pivotal movement on this pin is a carrier 18 in the form of a rigid frame, the side members 19 of which are spaced apart by spacers 20 and 21. Also mounted for pivotal movement on the pin 17 are a pair of arms 22 and 23. The opposite ends of the pin 17 extend through slots 24 positioned intermediate the ends of said arms. These slots are somewhat elongated in the direction of the length of the arms, but are adapted to fit the pin snugly in the direction of the height of the arms. Those portions of the arms adjacent the pin and in a rearward direction therefrom are formed to normally engage the side members 18 and 19 of the carrier and near the rear end of the carrier substantially vertical, semi-cylindrical, registering channels 25 are formed in the abutting faces of the carrier and arms and in these registering channels are positioned pins 26 which are adapted to function as fulcrums to permit of pivotal movement of the arms 22 and 23 in a direction toward and away from one another.

Forwardly of the pivot pins 26, bolts 27 are passed through the arms and through the walls 18 and 19 of the carrier and through rubber cushions 28, the cushions being positioned against the inner faces of the walls 18 and 19. The bolts are tightened sufficiently to place the rubber cushions under considerable pressure and the inherent resiliency of these cushions serves to normally maintain those portions of the arms which are contiguous to the carrier in face abutting relation to the side walls of the carrier. The elasticity of these cushions, however, will permit the forward free ends of the arms to be drawn apart, but as soon as release the cushions will again bring them toward one another.

The arms carry near their forward free ends a cutter and a follower. The cutter 29 is carried by the arm 23, while the follower 30 is carried by the arm 22. Both the cutter and follower are rigidly carried by their respective arms and are preferably supported therein by passing them through alined perforations in the arms and locking them in place by set screws. The mounting, however, of these elements may vary without departing from the invention, but it is of fundamental importance in the form of the invention shown that the cutter and follower be absolutely coaxial with one another.

After the machine has been initially manufactured and holes drilled to receive the cutter and follower in coaxial relation, they will maintain this relation as long as the machine holds together and there will be absolutely no tendency or possibility of this alinement becoming defective. I lay particular emphasis on this fact because it is important to the accurate cutting of crystals by tracing the outline of the bezel seat.

The mounting which I have described is such as to maintain the accuracy of alinement to which I have referred and yet permit the arms to be moved in the direction of their lengths by virtue of the pivotal movement of the rocker on the frame and said arms are also susceptible of pivotal movement with the carrier on the pin 17, all without impairing the alinement of the cutter and follower. Moreover, the arms are adapted to be drawn apart to permit the follower to be brought into cooperation with the bezel seat of the watch and the cutter to be simultaneously brought into cooperation with the crystal blank supported in the holder 4, but as soon as the arms are released and are permitted to come together, in order that the cutter may engage with the blank in a manner to cut or score the same, the alinement to which I have referred will be accurately maintained. The long vertical pivot provided by the pins 26 together with the fact that the pin 17 extends through said arms will effectually preclude lost motion which might tend to destroy the alinement.

The manner of operating the apparatus to cut crystals is as follows. The normal position of the parts is shown in full lines in Fig. 3. Here the arms are shown as tilted up to hold the cutter and follower away from the chuck and holder. The watch is shown as supported in the chuck and a suitable blank is mounted in the holder. The full line position of Figure 3 constitutes the starting position of the arms and is designated I. The free ends of the arms, which are preferably in the form of handles 31, are grasped by the operator who draws the arms in a direction away from one another to spring them apart as shown in dotted lines in Fig. 2, and while they are sprung apart, the arms are pivoted and rocked into the second position II of Fig. 3.

This is the starting position for the cutting operation. It will be noted that in this position, the follower 30 is in engagement with the bezel seat of the watch and at one corner thereof the cutter is in engagement with the blank under the resilient pressure of the rubber cushions 28. The arms are thereupon drawn forward into the third position designated III in Fig. 3, making the first cut which corresponds to the upper straight edge of the bezel seat shown in this figure. This cut is effected by a simultaneous rocking and pivotal movement of the arms in order that the follower may accurately trace the line of the seat.

Having completed the first cut, the handles while drawn in a forward direction are depressed into the position IV of Fig. 4, during which one curved end of the bezel seat is cut. The arms are thereupon impelled downwardly and simultaneously pushed backward in the direction of their length into the position V of Fig. 4, thus making the third cut corresponding to the lower straight edge of the bezel seat. The fourth and last cut consists in raising the handles 31 while the arms are impelled in a rearward direction to cause the follower to traverse the right hand end of the bezel seat and produce a correspondingly curved cut in the blank. At the conclusion of the cutting operation described, the arms will be in the position designated II in Fig. 3, and the cut having been completed the arms are drawn apart as shown in dotted lines in Fig. 2 and said arms are thereupon tilted back into the position I of Fig. 3.

It will be noted that during this entire operation, neither the watch nor the blank have moved. They have remained stationary and the cutting operation has been effected by movement of the cutter and follower made possible by the pivotal and rocking mounting which has been described.

In practice, the crystal is not generally cut through, but is merely scored or scratched, so that after the blank is removed from the holder slight pressure upon the crystal will cause the cut out part to drop away from the rest of the blank, thereby producing a finished crystal ready to be introduced into the bezel of the watch which has served as its pattern.

I may employ in carrying out the present invention any suitable cutter and any suitable follower. It is wholly within the scope of this invention to use a power rotated cutter if desired, but I have not considered it necessary to show such a cutter as power rotated cutters are well known. However, I do prefer in the carrying out of the present invention to use a particular type of follower which also constitutes a part of this invention. The preferred form of follower is shown in Fig. 5. It comprises a cylindrical body portion in the form of a pin 32, which is positioned coaxially of the cutter 29. The inner end of this pin is made hollow or bored out to provide a cylindrical recess 33 and in this recess is positioned a finger 34. The finger is provided with a shank 35, the end of which is anchored in a pocket formed in the base of the recess. The shank is resilient and the finger 34 is of somewhat less diameter than the interior diameter of the recess 33, being approximately one-half such diameter.

The finger 34 extends substantially to the end of the pin 32 and beyond the end of said pin it is provided with a knob 37 joined to the pin by a shank of reduced cross section. The knob 37 is of the same diameter as the finger 34. In other words, the diameter of the knob 37 is equal to the radius of the recess 33. Thus, if the finger is forced laterally to engage with one of the walls of the recess, and which movement is made possible by the resiliency of the shank 35, it will be apparent that the knob 37 will be tangent to the axis of the pin 32. It therefore follows that if the knob is engaged with the crystal seat of a watch bezel as shown in Fig. 5, the point of engagement between the knob and the seat will be the point of tangency between the knob and the axis of the pin and as the point of the cutter 29 is coaxial with the pin 32, it follows that the cut or score line of such cutter will correspond exactly to the corresponding point in the bezel seat. There results absolute accuracy in cutting of the crystal by the use of the follower construction shown in Figure 5.

The advantage of using a knob 37 is that the shank of the knob is adapted to reach over the edges of undercut bezels and permit the circumference of the knob to engage with the seat itself and not with the edge of the bezel adjacent the seat as has so frequently been the case under prior practice. It will of course be understood that the natural tendency of the operator to hold the follower to the bezel seat will cause the shank 35 of the follower pin to be laterally flexed as described so that this operation is in effect automatic and is not dependent upon any nice adjustment such as has been depended upon in prior machines.

In Fig. 7, I have illustrated a modified form of follower construction. In this structure, the follower pin 32a is made in the form of a tubular sleeve, one end having therein a recess 33a, one end of which is closed and provided with a tapped opening 38. The guide rod 35a is provided with a threaded part 39 operating through the tapped opening 38 and riveted to the end of the threaded part 39 is a finger piece 40 which may be grasped and rotated to rotate the rod 35a and thus move it longitudinally with respect to the pin 32a. The free end of the rod 35a is provided with a conical part 34a corresponding to the guide finger 34, the outer end of which carries a knob or guide point 37a as may be desired.

By adjusting the finger piece 40, the conical part 34a may be caused to enter to a greater or lesser extent into the mouth of the recess 33a in order to give a micrometer adjustment of the degree of lateral or radial flexing movement of the rod 35a. The structure of Figure 7 may be provided with either a guide point or a knob as may be desired and the structure of Figure 5 may be provided with a point instead of a knob without departing from this invention, but the knob is preferred. The advantage of the structure of Figure 7 is that the lateral movement of the guide point or knob may be accurately adjusted to produce the desired relation between the follower and the cutter and through this adjustment, it is possible not only to compensate for slight inaccuracies in a machine, but also to provide for the cutting of the crystal of a slightly smaller or larger size than the bezel seat.

I have particularly referred in the foregoing detailed description of the cutting of unbreakable crystals, such as celluloid and the like, but I wish it understood that the invention may be employed for the cutting of glass.

I wish to call particular attention to the marked simplicity of the structure which has been described. It may be manufactured with great economy and is of a rugged, durable and thoroughly reliable character. The fact that the bezel and blank may remain stationary during the entire cutting operation clearly distinguishes the present apparatus from all prior practice which invariably depended upon rotary movement of these parts, while the cutter and follower partook of slight radial movement. In accordance with the present invention, in contradistinction, the cutter and follower partake of the bodily pivotal and rocking movement to bodily traverse the periphery of the bezel seat and this arrangement permits of absolute accuracy in the cutting operation.

It will of course be understood that all conceivable shapes can be cut with the apparatus of this invention and the cutting operation can be carried out more expeditiously and with greater nicety than in machines heretofore employed for the cutting of crystals. Crystals cut by the present apparatus will accurately fit the bezels which form their pattern and no trimming, filing or other handwork is necessary thereon.

The foregoing detailed description sets forth the invention in its preferred practical form, but the invention is to be understood as fully commensurate with the appended claims.

Having thus fully described the invention, what I claim as new and desire to secure by Letters Patent is:

1. Watch crystal cutting apparatus embodying means to support the watch bezel to be fitted and a crystal blank in centered axial alinement and against relative movement with respect to one another, in combination with a crystal cutter, and a follower mounted in coaxial relation for identical simultaneous movements in all directions in planes which are respectively parallel to the plane of the bezel seat, said follower embodying a guide finger adapted for direct contact with the bezel seat and resiliently mounted for radial lost motion to an extent sufficient to position the periphery of the finger in tangential relation to the common axis of the follower and cutter, and means for limiting said lost motion of the guide finger to the extent stated.

2. Watch crystal cutting apparatus embodying means to support the watch bezel to be fitted and a crystal blank in centered axial alinement and against relative movement with respect to one another, in combination with a crystal cutter, and a follower mounted in coaxial relation for identical synchronous movements in planes which are respectively parallel to the plane of the bezel seat, said follower embodying a floating guide pin adapted to directly engage with the bezel seat and resiliently mounted to be sprung radially for a limited distance to bring the periphery of such pin into tangential relation to the common axis of the follower and cutter, and means for so limiting said radial movement of the guide pin.

3. A follower for watch crystal cutting apparatus comprising an element having a cylindrical recess therein, a guide pin positioned substantially axially within the recess and having a circular head of a diameter substantially equal to the radius of the recess, said pin being flexible to engage the walls of the recess when the head of the pin is urged into engagement with the bezel seat.

4. A follower for watch crystal cutting apparatus comprising an element provided with a circular seat, a circular member mounted for radial movement within the confines of and relative to said seat and normally tending to occupy a concentric position with respect to the seat, and a guide element rigid with the circular member and adapted for cooperation with the bezel seat.

5. A follower for watch crystal cutting apparatus comprising an element provided with a circular seat, a longitudinally tapered circular member mounted for radial movement within the confines of and relative to said seat and normally tending to occupy a concentric position with respect to the seat, a guide element rigid with the circular member and adapted for cooperation with the bezel seat, and means for axially adjusting such longitudinally tapered member with respect to the seat to regulate the degree of lateral movement of which said parts are relatively susceptible.

6. A follower for watch crystal cutting apparatus comprising a tubular supporting member provided at one end with a circular seat, a conical member positioned within the confines of and adapted to cooperate with said seat, a resilient rod connected to the conical member, extending longitudinally of the supporting member and having threaded connection therewith to axially adjust the conical member with respect to the seat and thus regulate the relative radial movement of which said member is susceptible with the seat, and a guide element extending from the other end of the conical member and adapted to coact with a bezel seat.

7. A watch crystal cutting apparatus embodying a base provided at one end thereof with an upstanding bracket and having at its other end a transversely extending pivot rod, a chuck, and a blank holder mounted upon said bracket to respectively support a watch bezel and a crystal blank in relatively rigid centered axial alinement and against movement with respect to the bracket while the blank is being cut, an upstanding link element, the lower end of which is mounted on said pivot rod and the upper end of which carries a rock shaft, the axis of which is parallel to the axis of the chuck and blank holder, a carrier pivotally mounted on said rock shaft for pivotal movement about the axis thereof, a pair of arms pivoted to the carrier, and the free ends of which arms extend to overlie the chuck and blank holder, the pivotal connection between the arms and the carrier being such as to permit the free ends of the arms to be moved toward and away from one another, said arms being mounted on the carrier against relative movement other than said movement toward and away from one another, a follower carried by one of said arms and adapted to cooperate with the bezel seat of a bezel supported in the chuck, and a cutter mounted on the other arm in substantially coaxial relation to the follower and adapted to act upon a blank supported by the blank holder, whereby the follower and cutter are adapted through movement of the arms to simultaneously partake of co-directional movements corresponding to the contour of the bezel seat while the bezel and blank are held stationary.

8. Watch crystal cutting apparatus embodying means to support a crystal blank and a watch bezel in relatively rigid, centered, axial alinement and against conjoint rotation while the blank is being cut, in combination with a follower and a cutter, members respectively supporting the follower and the cutter in substantially axial alinement and in engagement with the bezel seat and blank, respectively, means for mounting said members for universal movement in planes parallel to the bezel seat to permit the cutter to cut the blank while both the bezel and blank are held stationary and while the cutter is guided by engagement of the follower with the bezel seat, and means for supporting said members for pivotal movement to bring the follower and cutter into and out of engagement with the bezel and blank, respectively.

9. Watch crystal cutting apparatus embodying means to support the watch bezel to be fitted and a crystal blank in centered axial alinement and against relative movement with respect to one another, in combination with a crystal cutter, and a follower mounted in a substantially coaxial relation for identical simultaneous movements in all directions in planes which are respectively parallel to the plane of the bezel seat, said follower embodying a guide element adapted for direct contact with the bezel seat, means for mounting the guide element for lateral lost motion to an extent sufficient to position the periphery of said element in tangential relation to the common axis of the follower and cutter, and means for limiting said lost motion of the said guide element to the extent stated.

10. A follower for watch crystal cutting apparatus comprising an element having a recess with a circular follower seat therein, a guide member positioned within the recess and having a circular part exteriorly of said recess to engage with a bezel seat, and also having a circular part within said recess and juxtaposed with said follower seat, the diameter of the circular part juxtaposed with the follower seat, plus the diameter of the circular part which is adapted to engage the bezel seat, being substantially equal to the diameter of said follower seat, said member being laterally movable to engage with said follower seat when said member is held in engagement with the bezel seat.

11. A follower for watch crystal cutting apparatus comprising an element provided with a circular seat, a guide member positioned within the confines of the seat and having a circular portion juxtaposed with the circular seat, said guide member being movable to permit the circular portion thereof to engage with and circumferentially traverse said seat and the guide member having a part extending beyond said seat and positioned to be substantially tangential with the axis of the seat when the circular portion of the guide member is engaged with said seat.

12. A watch crystal cutting apparatus embodying means to support a crystal blank and a watch bezel in relatively rigid, centered, axial alinement and against conjoint rotation while a blank is being cut, in combination with a follower and a cutter, members respectively supporting the follower and the cutter in substantially axial alinement and for movement toward and away from one another to engage with and disengage from the bezel and blank respectively, means for normally resiliently maintaining the follower and cutter in engagement with the bezel and blank, respectively, means for mounting said members for universal movement in planes parallel to the bezel seat to permit the cutter to cut the blank while both the bezel and blank are held stationary and while the cutter is guided by engagement of the follower with the bezel seat.

In testimony whereof I have signed the foregoing specification.

CURT J. ROHLAND.